3,384,605
Patented May 21, 1968

3,384,605
COORDINATION POLYMERS
Anthony Joseph Saraceno, Devon, Pa., assignor to Pennsalt Chemicals Corporation, Philadelphia, Pa., a corporation of Pennsylvania
No Drawing. Continuation-in-part of application Ser. No. 479,607, Aug. 13, 1965. This application May 1, 1967, Ser. No. 634,918
14 Claims. (Cl. 260—2)

ABSTRACT OF THE DISCLOSURE

Polymers and copolymers involving a doubly bridged (catenated) trivalent octahedral metal coordinated with two unidentate ligands, whereby the polymer is terminated at each end with a bidentate ligand. These polymers and copolymers are useful as additives to hydraulic fluids and lubricants in order to improve viscosity-temperature characteristics.

---

This application is a continuation-in-part of S.N. 479,607, filed Aug. 13, 1965, and now U.S. Patent 3,328,296, granted June 27, 1967.

In accord with the invention described in U.S. Ser. No. 382,924, filed July 15, 1964 in the name of Anthony J. Saraceno, now U.S. Patent No. 3,275,574, granted Sept. 27, 1966, polymers and copolymers are available which have the repeating units $M(a)(b)X_2$ wherein M is a trivalent octahedral metal, $a$ is a unidentate ligand having a charge of minus one (that is, it is a negative monovalent ion such as hydroxyl), $b$ is a neutral unidentate ligand (such as a water molecule), and X is a bridging group also with a charge of minus one. Alternatively, these solid polymers may be represented as compounds containing a plurality of the following recurring units:

wherein M, $a$, $b$ and X are defined above and the repeating units may be the same (homopolymers) or different (copolymers). These polymers are useful for making fabricated articles and as coating compositions and have the additional advantage of having excellent high temperature stability. These polymers are useful as viscosity stabilizers for lubricants, but when used with hydraulic fluids (e.g. phosphate ester fluids) they are deficient in that they often cause gelation of the fluid. This may be due to further polymerization of the polymers occurring while in the fluid. It is essential that no such gelation occur, and by means of this invention, improved coordination polymers of the above type are provided which do not have this deficiency.

In accord with the invention there is provided a polymer having an intrinsic viscosity in chloroform not above 0.3 and consisting of a doubly bridged, trivalent, octahedral metal coordinated with two unidentate ligands wherein each of said bridging groups is the anion of an acid $R_2M'(O)OH$ where R is an inert radical, M' is an element selected from group VB having an atomic number greater than 7, and wherein one of said unidentate ligands is a hydroxyl ion and the second unidentate ligand is a water molecule, said polymer being terminated at each end with a bidentate ligand chelated to said octahedral metal.

As stated in Ser. No. 382,924 (U.S. Patent No. 3,275,574), the trivalent octahedral metal M may be any of the numerous metals characterized by having a relatively unstable +2 valence which can be oxidized to the stable trivalent oxidation state and has in its trivalent state a coordination number of six (i.e., an octahedral spatial configuration). By a relatively unstable +2 valence state is meant that the metal in its divalent state as its simple salts is capable of being oxidized to its trivalent state by air a ambient temperature and at atmospheric pressure. Such metals will include those metals selected from the group consisting of chromium, iron, ruthenium, europium and ytterbium.

The catenating or bridging group (X in the above formula of the polymers) will have a charge of minus one and will comprise the anion of an acid. The acid will be one having the structure $R_2M'(O)OH$ which is based on a group of metals and metalloids of group VB; that is, M' is an element of group VB having an atomic number greater than seven (e.g., phosphorus, arsenic, anthmony and bismuth). M' is preferably phosphorus and the preferred bridging groups are the anions of phosphinic acids. Many of these acids are disclosed by Kosolapoff in his book "Organophosphorus Compounds" (John Wiley, 1950). It is evident that for the purpose of forming the polymer backbone by bridging the octahedral metal M atoms, only three valences of the M' atom in each of the bridging groups are used. Thus the remaining valences of the M' atom are satisfied with the two R groups as shown above in the acid formula $R_2M'(O)OH$. These R groups may be the same or different inert organic groups such as alkyl, aryl, alkoxy or aryloxy radicals. Preferably R will be a hydrocarbon alkyl or aryl group containing from one to ten carbon atoms such as, for example, methyl, ethyl, t-butyl, hexyl, octyl, phenyl, tolyl, xylyl, naphthyl and the like. It will also be understood that the two bridging groups need not be the same.

The unidentate ligand $a$ will be a hydroxyl group and the unidentate ligand $b$ is a neutral molecule of water. These unidentate ligands are bonded to the trivalent octahedral metal and in combination serve to complete the coordination number of six and to give a polymer which is electrically neutral.

The bidentate ligands which terminate the polymers may be represented by

which indicates a chelating group wherein the donor atoms are preferably oxygen or nitrogen atoms. Such bidentate ligands will include molecules which are neutral, anionic with a monovalent charge and anionic with a divalent charge. Such neutral or anionic molecules will be capable of forming four, but preferably five or six membered chelate rings with the metal M. These bidentate ligands are well known and are discussed in the text "Chemistry of the Coordination Compounds," Reinhold, 1956, edited by John C. Bailar, Jr. Specific bidenate ligands which illustrate the many useful in the invention include numerous types, such as:

A. NEUTRAL LIGANDS

Examples of such types are diols and diamines. Of the diol type both aliphatic and cycloaliphatic are useful. For example, specific compounds useful include aliphatic diols of the formula

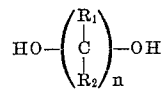

where $n$ is 2 to 3, and $R_1$ and $R_2$ are inert groups such as H, F, alkyl, or aryl radicals, 1,2-dihydroxycyclohexane, amines of formula

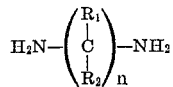

where $n$ is 2 to 3 and $R_1$ and $R_2$ are defined above, o-phenylenediamine, 1,2-diaminocyclohexane, and the like. Also useful are aromatic diethers such as veratrole.

B. ANIONIC LIGANDS (1) Anions having a charge of minus one

This type of bidentate ligand also includes a wide variety of compounds. These will include amino acids such as

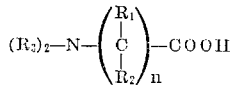

where $n$ is from 1 to 3, $R_1$ and $R_3$ are the same as $R_1$ and $R_2$ which are defined above (e.g., $NH_2\text{-}CH_2\text{-}COOH$, $NH_2\text{-}CH_2\text{-}CH_2\text{-}COOH$, $NH_2\text{-}CH\text{-}COOH$
$\phantom{(e.g., NH_2\text{-}CH_2\text{-}COOH, NH_2\text{-}CH_2\text{-}CH_2\text{-}COOH, NH_2\text{-}CH\text{-}}CH_3$)

fluoralkyl amino acid, etc.
hydroxycarboxylic acids (e.g., $HO\text{-}(CH_2)_n\text{-}COOH$; $n=1$ or 2)

acetylacetone and its derivatives

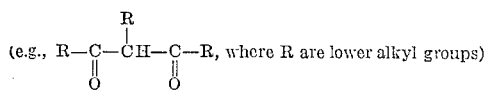

aromatic aldehydes having an ionizing group adjacent to the aldehyde groups

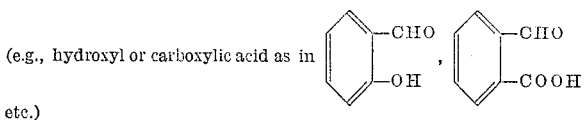

etc.)

heterocyclic compounds such as pyridine and quinoline derivatives (e.g., picolinic acid, 8-hydroxyquinoline, etc.), and like bidentate ligand compounds having an anionic group. Of particular interest in this group are the acids such as picolinic acid and the amino acids. Of the latter, a preferred group are the fluoroalkyl amino acids which are disclosed and claimed in U.S. 3,238,235 and U.S. 3,238,236 and which are characterized by the structures:

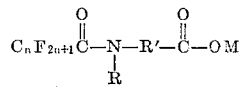

and

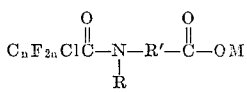

where $C_nF_{2n+1}$ is a perfluoroalkyl group which may have a straight or branched chain; where $C_nF_{2n}Cl$ is a monochloroperfluoroalkyl group wherein the alkyl is terminally chloro substituted which may have a straight or branched chain; where $n$ is an integer having a value ranging from 3 to 15; where R is hydrogen or an alkyl group (which may be straight or branched) having from 1 to 4 carbon atoms; where R' is an alkylene radical or a monohydroxyalkylene radical (which may be straight or branched) having from 1 to 6 carbon atoms and where M is hydrogen, an alkali metal or ammonium.

Numerous examples of these fluoroacids are given in the above mentioned patents.

(2) Anions having a charge of minus two

This type of bidentate ligand includes aliphatic and aromatic dicarboxylic acids of the type:

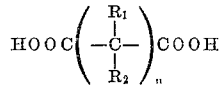

where $n$ is 0 to 3 and $R_1$ and $R_2$ are defined above, and HOOC—R—COOH where R is an aryl radical; e.g., oxalic acid, malonic acid, o-phthalic acid, etc. Salicylic acid is also a useful bidentate ligand having a charge of minus two. Also useful are diphosphinic acids such as

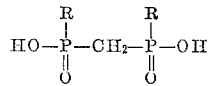

and the like; dioximes

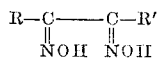

(R is lower alkyl or phenyl); o-cresol; and similarly structured molecules.

Attention is also directed to U.S. Patent 3,197,436, particularly column 1, lines 40 et seq. where numerous bidentate ligands are disclosed and those ligands are also useful in this invention.

The process by which the improved polymers of this invention are prepared involves several steps. It is first necessary to make the polymer of Ser. No. 382,924 (U.S. Patent No. 3,275,574) and then react that polymer with the bidentate ligand. Preparation of the polymers of Ser. No. 382,924 (U.S. Patent No. 3,275,574) is a two step procedure and in the first step one mole of a salt of the metal M in its divalent form is reacted with two moles of the anion $R_2M'(O)O^-$.

After the divalent metal salt and the anion of the acid $R_2M'(O)OH$ are reacted in the first step, the intermediate product where M is in the divalent form, is then oxidized in the second step and this is done in the presence of the neutral and univalent ligands. It is not necessary to isolate the intermediate polymer, but the oxidation may be carried out in the reaction system of the first step of the process.

The following steps illustrate the method:

(1) 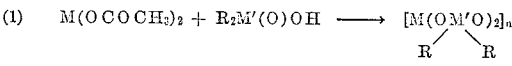

(2) 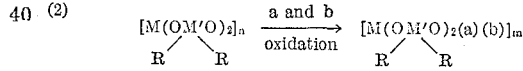

where M in the above equations is the metal capable of existing in the divalent and trivalent states, $R_2M'(O)OH$ is the acid whose anion becomes the bridging group, $a$ is the univalent ligand ($OH^-$) and $b$ is the neutral ligand ($H_2O$). The oxidation step results in coordination of the two new groups and, as indicated, the polymers comprise an octahedral metal having a completely inorganic backbone wherein the coordinated groups are entirely inorganic. In Equation 2 above, $a$ is the negative monovalent ion as defined above and results from the oxidation system and $b$ is the neutral ligand obtained from water.

The divalent metal salt which will be used (shown as the acetate in Step 1 above) may be any salt having a greater solubility in the reaction medium than does the intermediate formed in Step 1. Such salts include the chloride, nitrate, perchlorate, acetate and the like. In general, however, the acetate and chloride will be preferred because of their ready availability. Specific starting salts will include chromous acetate, chromous chloride, ferrous sulfate, ferrous acetate, ruthenium dichloride, europous chloride, ytterbium dichloride, and the like. In carrying out Step 1 with the divalent metal salt the process proceeds under neutral or acid conditions. Thus, for example, the reaction may be carried out in the presence of an alkali or alkaline earth metal salt of the acid, or the free acid of the catenating acid group may be employed. It has been found that when potassium hydroxide is used in the reaction mass so that the potassium salt of the catenating acid is employed, a polymeric product is obtained which has a somewhat higher intrinsic viscosity than that obtained with the sodium salt.

The oxidant used in the process may be any conventional oxidant such as oxygen, NO, $NO_2$, hydrogen peroxide, chlorine, bromine, tetracyanomercurate ion (which can be made in situ by reaction of KCN with mercuric cyanide), and the like, but in general the oxygen in air will be used.

The invention includes improved copolymers and these are obtained by carrying out the first step of the process with a mixture of bridging acids. Alternatively, copolymers can be obtained by oxidizing a mixture of different reaction products previously obtained in the first step. Still another type of copolymer is obtained by carrying out the oxidation with more than one oxidant which results in repeating units having different ligands in the polymer. Copolymers wherein the metal entity differs are also included in the invention, as, for example, a polymer obtained by using a mixture of chromous acetate and ferrous acetate as the divalent metal reactants.

Polymers prepared as described above and having an intrinsic viscosity not exceeding about 0.3 will be used for reaction with the bidentate ligand. This is done by dissolving it in an organic solvent, preferably tetrahydrofuran or other solvents such as ethanol, methanol, chloroform, and the like, and adding the bidentate ligand while stirring to said solution. The polymers must have an intrinsic viscosity not exceeding about 0.3 in order that they be soluble in the phosphate ester fluid in which they are used. If the intrinsic viscosity exceeds 0.3 then the polymer is insoluble in the ester fluid and cannot be used as a viscosity index improver.

The amount of bidentate ligand will be limited to no more than one mole of the ligand per mole of chromium in the polymer since more than this amount tends to cause polymer degradation under usual reaction conditions. From about 0.005 mole per mole of chromium will be the lower limit, but preferably from about 0.1 to 0.3 mole per mole of chromium will be used.

After removing all air from the system by purging with an inert gas such as nitrogen in order to avoid any peroxide formation from the solvent, the solution is heated for a short time (usually 0.5 to 3 hours) at about 50° to 75° C. The modified polymer is then recovered by pouring its solvent solution into a large excess of water, the precipitated polymer filtered and after washing with water and drying the improved polymer of the invention is ready for use.

The polymers of the invention are similar in appearance to and have many general properties of the polymers of Ser. No. 382,924 (U.S. Patent No. 3,275,574), but they do not show any change in intrinsic viscosity with time. This makes them of particular value for uses where little or no viscosity changes may be tolerated, as in hydraulic fluids, oils and the like to which they impart viscosity stabilization. This viscosity stabilization is imparted at concentrations in the fluid from about 1% to 10% by weight and at such concentrations these polymers have little effect, if any, on the lubricating value of the fluids.

The hydraulic fluids incorporating the improved inorganic polymers will be preferably the tri-esters of phosphoric acid. Preferably R will be selected from the group consisting of aliphatic and aromatic hydrocarbon groups containing from one to about ten carbon atoms and still more preferably R will be aromatic. Useful fluids will include tricresyl phosphate, tristearyl phosphate, trioctyl phosphate, lauryl octyl phenyl phosphate, diethyl phenyl phosphate, butyl dicresyl phosphate, butyl dilauryl phosphate, lauryl dicyclohexyl phosphate, dimethyl cyclohexyl phosphate, tricyclohexyl phosphate, cyclohexyl dicresyl phosphate, lauryl dicresyl phosphate, lauryl diphenyl phosphate, dioleyl cresyl phosphate, oleyl diphenyl phosphate, triethyl phosphate, trilauryl phosphate, tributyl phosphate, phenyl dicresyl phosphate, diphenyl cresyl phosphate, amyl diphenyl phosphate, tri-naphthyl phosphate, and the like. These and other phosphates having the above formula are well known in the art as is their preparation.

The modified fluids have the advantage of improved thermal stability. Furthermore, this advantage is obtained by using only low concentrations of the modified polymers for viscosity control. Because of the low amounts required to cause the desired effect, there is little effect on the lubricating quality of the fluids. It will be understood that the concentration range at which the inorganic polymers are used may vary considerably and will vary from about 1% to about 10% depending on the particular use of the fluid desired. For example, where high viscosity is not particularly desirable, concentration may be on the order of 1 to 3% by weight. In other applications, however, where high viscosities are wanted, concentrations exceeding this amount and up to about 10% may be employed. The inorganic polymers are quite effective in modifying the fluids and improve the ASTM slope; that is, the measurement of the change of viscosity with temperature. Furthermore, the modified fluids do not degrade upon extended heating in elevated temperatures even at the limit of the fluid's normal stability.

The following examples will serve to more fully illustrate the invention:

Example 1

To a freshly prepared suspension of $$Cr(OCOCH_3)_2 \cdot H_2O$$

in ethanol was added a stoichiometric amount of $(CH_3)(C_6H_5)P(O)OH$ under air-free conditions ($N_2$ atmosphere) at room temperature. After stirring for ½ to 2 hours the pressure was reduced and the excess ethanol and acetic acid were removed by distillation at room temperature. Air (undried) was allowed to diffuse slowly to the reaction mixture, and the resultant product was washed with water and dried at 100° C. The products prepared in this manner have high molecular weights as deduced from ebulliometry and viscosity measurements. Table I gives the data obtained.

TABLE I

| | |
|---|---|
| $Cr(OCOCH_3)_2 \cdot H_2O$ | g-- 2.7 |
| $(CH_3)(C_6H_5)P(O)OH$ | g-- 4.15 |
| Reaction time | min-- 39 |
| Other conditions | (¹) |
| Intrinsic viscosity | 0.11 |

¹ Room temp., overnight pumping at 10 mm.

Analysis of polymer

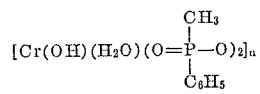

Calculated, percent: Cr, 13.09; P, 15.61; C, 42.32; H, 4.82. Found, percent: Cr, 13.5; P, 14.15; C, 42.05; H, 4.35. Mol wt., 5,300.

A solution of 7.946 g. of the above polymer in 600 ml. of tetrahydrofuran is stirred for 1 hour and filtered to remove any solids present. Then 0.2462 g. of picolinic acid is added to the filtered solution with stirring. The mixture is purged with $N_2$ for 15 min. and thermostatted in a 55–60° C. bath for 1 hour. At the end of this time the polymer is precipitated by pouring the tetrahydrofuran solution into 1400 ml. of $H_2O$ and stirring for 3 hours. The polymer is recovered by filtration, washed ten times with warm $H_2O$ and dried in a vacuum oven for 3 hours at 50° C. The polymer obtained is a green powder which decomposes on heating at about 270° C.

When a 3% by weight solution of the above polymer in chloroform is heated at 55° C., the intrinsic viscosity increases from its original value of 0.11 to only 0.13. On the other hand, a 3% chloroform solution of the polymer before treatment with picolinic acid shows an increase in intrinsic viscosity at 55° C. to 0.9.

Instead of using picolinic acid in the above example, 8-hydroxy quinoline and ethylenediamine may be used with equivalent results. Likewise, a mixture of bidentate ligands may be used. This is illustrated in the following table:

TABLE II

| Example | Chelating Agent(s) | Concentration Used (Moles/mole Cr) |
|---|---|---|
| 2 | Picolinic Acid | 0.05 |
|   | Ethylenediamine | 0.05 |
| 3 | Picolinic Acid | 0.15 |
|   | Ethylenediamine | 0.05 |
| 4 | Picolinic Acid | 0.20 |
|   | Ethylenediamine | 0.05 |
| 5 | 8-hydroxyquinoline | 0.05 |
|   | Ethylenediamine | 0.05 |

These polymers do not differ in their gross visible properties from the polymer from which they are prepared and all have an intrinsic viscosity value in $CHCl_3$ on the order of 0.09 to 0.12.

The following example illustrates the use of the polymers of the invention to control the viscosity of a phosphate ester fluid.

To 20 ml. of commercial grade tricresyl phosphate, 0.6 g. (3% by weight) of the polymer was added. Under a blanket of $N_2$ and under magnetic stirring the mixture was heated slowly to 160° C. over an 8-hour period, cooled, and then filtered. The viscosity of the composition was then determined at 100° F. after the oil had been heated for extended periods at 374° F., the maximum service temperature of tricresyl phosphate.

TABLE III

| | 100° F. Viscosity (centistokes) after heating at 374° F. for— | | |
|---|---|---|---|
| | 0 hrs. | 66 hrs. | 140 hrs. |
| None added | 28.5 | 29.3 | 29.7 |
| Unmodified polymer of Example 1 | 200 | Gel | Gel |
| Modified polymer of Example 1 | 42.4 | 78.4 | 115.6 |
| Polymer of Example 3 | 39.8 | 71.5 | 100.5 |
| Polymer of Example 4 | 37.1 | 61.6 | 61.3 |
| Polymer of Example 5 | 42.6 | 228.1 | |

It is seen from the above data that with no additive the non-viscous tricresyl phosphate liquid shows no increase in viscosity on heating and that the unmodified inorganic polymer additive causes gelation and therefore is of no value for fluid products. On the other hand, the improved polymers of the invention impart viscosity control permitting a desirable high temperature viscosity without gelation. This is particularly surprising because other additives lose their viscosity control effects with prolonged heating. The various end-capped polymers of this invention increase or reach a constant value with heating time and thus timed viscosity changes are possible, the rate of increase depending on the particular high temperature application for which the fluid might be used. Any viscosity between that of tricresyl phosphate and $10^{13}$ centistokes can be obtained by incorporation of the improved polymers of this invention in the fluid lubricants.

Example 6

The efficiency of a viscosity index improver may be measured by the ASTM slope, which measurement represents the difference in viscosity of a fluid at two specific temperatures, namely, 100° F. and 210° F. This test is discussed in detail in the test by Hatton, Introduction to Hydraulic Fluids, Reinhold Publishing Corporation, 1962. A low ASTM slope for a given fluid indicates that there is little viscosity change with temperature. It will be seen from the following example that the improved inorganic polymers of the invention are outstandingly effective with regard to ASTM slope improvement and stabilization.

Using the improved polymer described in Example 1, a mixture of it and tricresyl phosphate was made at varying concentrations of the improved polymer. Each of the mixtures was heated at 374° F. and the ASTM slope determined. The results of this test are shown in the following table:

TABLE IV

| | Hrs. at 374° F. | ASTM Slope |
|---|---|---|
| Conc. (percent by wt.): | | |
| 0 | 0 | 0.83 |
| 0 | 140 | 0.88 |
| 3 | 0 | 0.74 |
| 3 | 140 | 0.69 |
| 3 | 236 | 0.55 |
| 5 | 0 | 0.62 |

It is clear from the above table that with no additives present when the tricresyl phosphate is heated the ASTM slope actually increases somewhat. On the other hand, when 3% of the polymer is present, the ASTM slope decreases significantly. It is also of interest to note that at a 5% concentration level, the ASTM slope is somewhat less than at the 3% concentration level thus indicating that with greater amounts of the inorganic polymer further control of ASTM slope is possible. All presently used additives with hydraulic fluids show an increase in ASTM slope values on heating. Thus it is extremely significant that with the improved inorganic polymers of this application, a new and surprising breakthrough in viscosity control was obtained.

Example 7

The picolinic acid capped polymer of Example 1 was added to diphenylcresylphosphate, a low viscosity triarylphosphate hydraulic fluid, and the improvement in ASTM slope noted. The following table gives the data obtained:

TABLE V

| Moles of Picolinic Acid added per Mole of Chromium | Concentration of Polymer in fluid (Percent by weight) | ASTM Slope | Viscosity at 150° F. (Centistokes) |
|---|---|---|---|
| 0.10 | 3 | 0.729 | 13.1 |
| 0.15 | 3 | 0.749 | 12.3 |
| 0.10 | 5 | 0.675 | 24.1 |
| 0.15 | 5 | 0.685 | 25.5 |
| | 0 | 0.842 | 6.3 |

Example 8

Following the specific details of the above examples end-capped polymers having an intrinsic viscosity in chloroform ranging from 0.2 to 0.25 and made as follows show similar viscosity-index improvement in phosphate ester fluids:

| Polymer | | | | Bidentate Ligand |
|---|---|---|---|---|
| Octahedral Metal | R | R | Group VB Element | |
| Cr | $C_6H_5$ | $C_6H_5$ | P | Picolinic Acid. |
| Fe | $C_6H_5$ | $CH_3$ | P | Ethylenediamine. |
| Cr | $C_6H_5$ | $CH_3$ | As | Picolinic Acid. |
| Cr | $CH_3$ | $CH_3$ | P | Acetylacetone. |
| Cr | $C_8H_{17}$ | $C_4H_9$ | P | Picolinic Acid. |

Example 9

The polymer of formula $$[Cr(H_2O)(OH)(OP(C_6H_5)(CH_3)O)_2]_x$$ 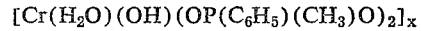

is end-capped with malonic acid using 0.1 mole of the acid per mole of chromium in the molecule. The initial intrinsic viscosity of the end-capped polymer in chloroform is 0.09 which on standing in $CHCl_3$ for 8 days increases to about 0.3. This polymer is suitable for improving the viscosity index of phosphate ester fluids as above described.

Example 10

Following the specific details of the above examples, end-capped polymers having an intrinsic viscosity in chloroform ranging from 0.2 to 0.3 are made and characterized as follows:

| Polymer | | | | Bidentate Ligand |
|---|---|---|---|---|
| Octahedral Metal | R | R | Group VB Element | |
| Cr | $C_6H_5$ | $C_6H_5$ | P | $C_{11}F_{23}\overset{O}{\overset{\|}{C}}-NH-CH_2CH_2-\overset{O}{\overset{\|}{C}}-OH$ |
| Cr | $C_6H_5$ | $CH_3$ | P | $(CF_3)_2CFCF_2\overset{O}{\overset{\|}{C}}-\underset{\underset{CH_3}{\|}}{N}-CH_2CH_2\overset{O}{\overset{\|}{C}}-OH$ |
| Cr | $CH_3$ | $CH_3$ | As | $HO-CH_2CH_2-OH$ |
| Fe | $C_6H_5$ | $CH_3$ | P | $HO-\underset{\underset{O}{\|}}{\overset{\overset{C_6H_5}{\|}}{P}}-CH_2-\underset{\underset{O}{\|}}{\overset{\overset{C_6H_5}{\|}}{P}}-OH$ |

These polymers exhibit viscosity index improvements when used in phosphate ester fluids.

It will be understood that numerous changes and variations may be made from the above description and examples without departing from the spirit and scope of the invention.

I claim:
1. A polymer having an intrinsic viscosity in chloroform not above about 0.3 consisting of a doubly bridged, trivalent, octahedral metal selected from the group consisting of chromium, iron, ruthenium, europium and ytterbium coordinated with two unidentate ligands wherein each of said bridging groups is the anion of an acid $R_2M'(O)OH$ where R is an inert radical selected from the group consisting of alkyl, aryl, alkoxy and aryloxy radicals, M' is an element selected from group VB having an atomic number greater than 7, and wherein one of said unidentate ligands is a hydroxyl ion and the second unidentate ligand is a water molecule, said polymer being terminated at each end with a bidentate ligand chelated to said octahedral metals.

2. The polymer of claim 1 wherein the octahedral metal is chromium.

3. The polymer of claim 1 wherein the octahedral metal is iron.

4. The polymer of claim 1 wherein M' is arsenic.

5. The polymer of claim 1 wherein M' is phosphorus.

6. A polymer having an intrinsic viscosity of chloroform not above about 0.3 consisting of a doubly bridged chromium atom coordinated with a unidentate ligand which is a hydroxyl ion and a second unidentate ligand which is a water molecule, said bridging groups consisting of the anion of $R_2P(O)OH$ where R is a member of the group consisting of hydrocarbon alkyl and aryl radicals containing from one to ten carbon atoms, said polymer being terminated at each end with a bidentate ligand chelated to said chromium atoms.

7. A polymer as in claim 6 wherein the bidentate ligand is picolinic acid.

8. A polymer as in claim 6 wherein the bidentate ligand is 8-hydroxy quinoline.

9. A polymer as in claim 6 wherein the bidentate ligand is ethylenediamine.

10. A polymer having an intrinsic viscosity in chloroform not above about 0.3 consisting of a doubly bridged chromium atom coordinated with water and a hydroxyl group, said bridging group consisting of the anion of dimethylphosphinic acid, and said polymer being terminated at each end with a bidentate ligand chelated to said chromium atoms.

11. A polymer having an intrinsic viscosity in chloroform not above about 0.3 consisting of a doubly bridged chromium atom coordinated with water and a hydroxyl group, said bridging group consisting of the anion of diphenylphosphinic acid, and said polymer being terminated at each end with a bidentate ligand chelated to said chromium atoms.

12. A polymer having an intrinsic viscosity in chloroform not above about 0.3 consisting of a doubly bridged chromium atom coordinated with water and a hydroxyl group, said bridging group consisting of the anion of methylphenylphosphinic acid, and said polymer being terminated at each end with a bidentate ligand chelated to said chromium atoms.

13. A polymer as in claim 12 wherein the bidentate ligand is picolinic acid.

14. A polymer as in claim 12 wherein the bidentate ligand is a mixture of picolinic acid and ethylenediamine.

References Cited
UNITED STATES PATENTS

| | | | |
|---|---|---|---|
| 3,197,436 | 7/1965 | Block et al. | 260—2 |
| 3,275,574 | 9/1966 | Saraceno | 260—2 |
| 3,328,296 | 6/1967 | Saraceno | 252—32.5 |
| 3,331,774 | 7/1967 | Saraceno | 252—32.5 |

SAMUEL H. BLECH, *Primary Examiner.*